United States Patent

Kalisiak et al.

[11] Patent Number: 5,282,614
[45] Date of Patent: Feb. 1, 1994

[54] ROTATION OF A DOCUMENT THROUGH A FINITE ANGLE

[75] Inventors: Michael S. Kalisiak, North Tonawanda, N.Y.; John E. Traise, Palm Bay, Fla.

[73] Assignee: Moore Business Forms, Inc., Grand Island, N.Y.

[21] Appl. No.: 697,994

[22] Filed: May 10, 1991

[51] Int. Cl.$^5$ .............................. B65H 7/02
[52] U.S. Cl. .................. 271/227; 271/265; 271/270; 271/272
[58] Field of Search .............. 271/225, 227, 228, 265, 271/270, 272, 274, 184, 148, 229; 198/394, 401, 411, 415

[56] References Cited

U.S. PATENT DOCUMENTS

| | | | |
|---|---|---|---|
| 1,581,583 | 4/1926 | Low | 271/225 |
| 3,603,446 | 9/1971 | Maxey | 271/227 |
| 4,438,917 | 3/1984 | Janssen et al. | 271/227 |
| 4,445,679 | 5/1984 | Bay | 271/227 |
| 4,482,147 | 11/1984 | Hibi et al. | 271/229 |
| 4,500,086 | 2/1985 | Garavuso | 271/225 |
| 4,511,242 | 4/1985 | Ashbee et al. | 271/227 |
| 4,558,373 | 12/1985 | Plasencia et al. | 271/227 |
| 4,724,945 | 2/1988 | Martin | 198/412 |
| 4,801,134 | 1/1989 | Yokoyama et al. | 271/122 |
| 4,855,607 | 8/1989 | Eckl | 271/227 |
| 4,877,234 | 10/1989 | Mandel | 271/225 |
| 4,955,964 | 9/1990 | Hain | 271/225 |
| 4,955,965 | 9/1990 | Mandel | 271/225 |
| 4,971,304 | 11/1990 | Lofthus | 271/227 |

FOREIGN PATENT DOCUMENTS

| | | | |
|---|---|---|---|
| 149175 | 11/1979 | Japan | 271/227 |
| 82255 | 4/1988 | Japan | 271/228 |

Primary Examiner—H. Grant Skaggs
Attorney, Agent, or Firm—Nixon & Vanderhye

[57] ABSTRACT

Sheets, such as business forms, are turned so that their orientation is changed from landscape to portrait mode, or vice versa. Simple apparatus effects sheet rotation, and includes a conveyance surface on which a sheet travels in a first direction, first and second rollers for engaging the sheet traveling on the conveyance surface, and first and second drives (e.g., D.C. stepper motors) for driving the first and second rollers independently of each other. A sensor senses the position of the sheet just downstream of the rollers, and a controller (computer-)—in response to the sensor—controls the speed and direction of rotation of the motors so that one roller rotates with a given tangential speed in a first direction of rotation, while the other roller rotates at that same speed in an opposite direction of rotation.

20 Claims, 5 Drawing Sheets

ROTATION OF A DOCUMENT THROUGH A FINITE ANGLE

BACKGROUND AND SUMMARY OF THE INVENTION

There are many circumstances when it is desirable to change the orientation of a sheet when feeding it from one piece of equipment to the other. This is especially true in the handling of business forms, whether single-part or multi-part forms, when it is desirable to act upon the forms in portrait mode in one piece of equipment, and landscape in another piece of equipment. There have been numerous mechanisms developed in the prior art for effecting rotation of sheets to effect this purpose; however, such sheet rotating mechanisms typically are mechanically complex and/or require a large surface to effect turning.

According to the present invention, a method and apparatus are provided for effecting the rotation of sheets, such as business forms, from landscape to portrait mode, or vice versa, or any orientation therebetween, in a simple yet effective manner, and with a minimum amount of space required to effect rotation.

The simple apparatus according to the invention comprises a conveyance surface on which a sheet, having a first orientation, travels in a first direction; first and second rollers for engaging the sheet traveling on the conveyance surface; first and second drive means, such as reversible motors (preferably D.C. stepper motors) operatively driving the first and second rollers, respectively, independently of each other; sensing means for sensing the leading edge of a sheet having a first orientation, with respect to the rollers, located just downstream of the rollers in the first direction; and control means for controlling speed and direction of rotation of the drive means in response to the sensing means. The rollers are spaced from each other in a second direction, generally transverse to the first direction, and their spacing in the second direction is relatively small, much less than the dimensions of a sheet being rotated. The control means preferably comprises a computer means for controlling the drive means to effect rotation of the sheet by driving the first rollers so that the tangential velocity thereof is in the first direction, and at a first speed, and by driving the second roller so that the tangential velocity thereof is in a third direction, opposite the first direction, and at the same speed as the first roller.

Typically, nip wheels, mounted on spring biased arms, are associated with the first and second rollers to hold the sheet in contact therewith. Also, a hold-down strap may extend between the rollers for facilitating engagement of the sheet with the conveyance surface. A pair of conveyor belts—mounted outside of the first and second rollers—preferably are provided for conveying the sheet in the first direction to the first and second rollers, and away from the first and second rollers, conveyance in the first direction taking place the entire time the apparatus is being operated.

The invention also contemplates a method of reorienting a sheet using first and second drive means which rotate first and second rollers independently of each other. The method comprises the following steps: (a) feeding the sheet, with a first orientation, in a first direction to a location adjacent the first and second rollers, at which the rollers engage the sheet; (b) at the location adjacent the first and second rollers, sensing the leading edge of the sheet; and (c) in response to step (b), controlling the drive means, to in turn control the speed and direction of rotation of the rollers, so that the rollers rotate the sheet to a predetermined second orientation, significantly angularly displaced from the first orientation. The rollers are spaced apart in a second direction, generally transverse to the first direction, and step (c) is preferably practiced by controlling the first drive so that the tangential velocity of the first roller is in a third direction, opposite the first direction; and the speed of rotation of the rollers is the same, merely in opposite directions. Step (c) is preferably practiced to move the sheet through an angle of approximately 90°, and the sheet is continuously conveyed in the first direction during the practice of steps (a) and (c). The location at which sensing takes place in step (b) is less than one-half the dimension of the sheet in the first direction when it has its first orientation, and under the sheet during rotation.

The term "sheet" as used in the present specification and claims encompasses single-part or multi-part documents of all construction, including business forms, and sheets of paper, film, plastic, or the like that are typically transferred from one piece of handling equipment to another, especially in the business forms art.

It is a primary object of the present invention to provide a simple yet effective method and apparatus for effecting rotation of sheets during transport from one piece of equipment to the other, and with a minimum of turning space required. This and other objects of the invention will become clear from an inspection of the detailed description of the invention, and from the appended claims.

DETAILED DESCRIPTION OF THE DRAWINGS

Figure 1:
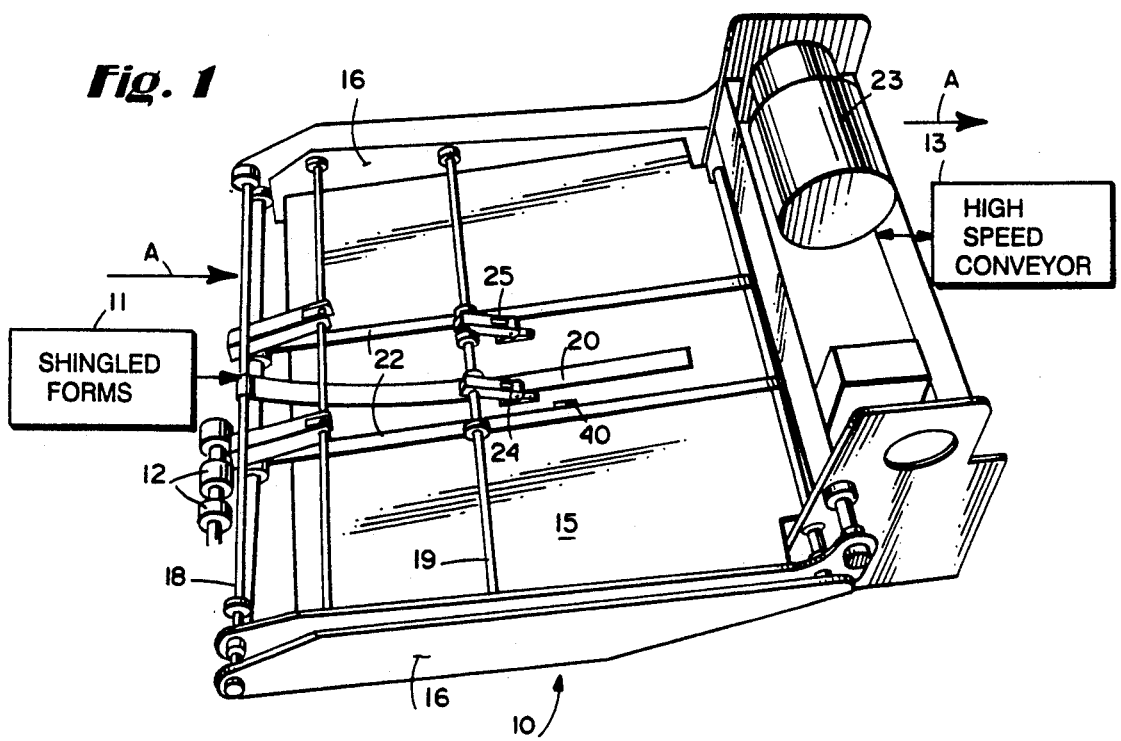
FIG. 1 is a top perspective view of exemplary apparatus for rotating a sheet according to the present invention.

A turn module, for effecting rotation of a sheet, according to the present invention is shown generally by reference numeral 10 in FIG. 1. While the turn module 10 can be utilized with a wide variety of equipment depending upon the particular sheets involved, and the use to which they are put, an exemplary assembly in which the turn module 10 is used is associated with a source of shingled business forms 11, in cooperation with de-shingling rollers 12 which feed the business forms (either multi-ply or single ply) to the turn module 10. After being rotated—e.g. from landscape to portrait mode—by the turn module 10, the sheets are then fed to the high speed aligning conveyor 13, or the like, such as shown in pending U.S. application Ser. No. 07/604,858 filed Oct. 26, 1990.

The turn module 10 according to the present invention has a generally horizontal conveyance surface 15, along which sheets to be turned are fed in the direction of arrows A, the direction A comprising a first direction. While the surface 15 is generally horizontal, it can have a positive or negative slope. In the exact embodiment illustrated in FIG. 1, the surface 15 slopes upwardly in direction A slightly, e.g., several degrees (e.g., about 1°-5°). The surface 15 is defined on either side thereof by the upright flanges 16, having a plurality of rods extending therebetween, such as the rods 18 and 19. Mounted on the rod 18 is a hold-down strap of flexible relatively stiff material, such as a stiff plastic, which operates to facilitate holding of the sheets down onto the surface 15, especially just after being acted upon by the operative components of the turn module 10.

In order to continuously convey sheets in direction A, it is preferred to provide some sort of a conveyor. Preferably, a pair of endless conveyor belts 22 are provided, straddling the strap 20 and the center of the surface 15; the belts 22 are driven in conventional manner by the motor 23, which motor 23 can also serve as a drive motor for the high speed conveyor 13.

Mounted on the rod 19 are first and second nip wheels 24, 25. The nip wheel 24—see FIGS. 2 and 3—is mounted by arms 26 so that the axis thereof—a generally horizontal axis perpendicular to the direction A—is movable up and down. The arms 26 mount the nip wheel 24 for pivotal movement both about the rod 19, and for rotation about its axis. Preferably a torsion spring 27 or the like biases the arms 26 so that the nip wheel 24 is biased downwardly (along with its weight biasing it downwardly). Similarly, the nip wheel 25 is mounted by arms 28, with the torsion spring 29 providing a biasing force. The nip wheels 24, 25 are located between the conveyor belts 22, and the hold-down strap 20 is therebetween.

The operative turning components according to the present invention include first and second drive means 31, 32. Preferably the drive means 31, 32 are reversible motors, such as conventional D.C. stepping motors, e.g., motors of the PX245 series stepping motors from Oriental Motor Company Ltd. However, other drives that could be used as the drive means are servo motors, mechanical drives (e.g., belts or chains) using magnetic clutches, hydraulics, or pneumatics. The drives 31, 32 rotate shafts 33, 34, respectively, which have rollers 35, 36 associated therewith. The drives 31, 32 are mounted so that they are below the surface 15—see FIGS. 2 and 3—and the rollers 35, 36 are mounted so that the peripheral surfaces 37, 38, respectively, thereof extend upwardly through the surface 15 and are operatively engaged by the nip wheels 24, 25.

The axes of the shafts 33, 34 are generally horizontal, preferably vertically in line with the axes of the nip wheels 24, 25, and in line with each other. The rollers 35, 36 are spaced a relatively short distance apart, significantly less than the width of a sheet 39 (see FIGS. 4 and 5) to be acted upon thereby. For example, the rollers 35, 36 may be spaced about four inches.

The rollers 35, 36 are clamped to the shafts 33, 34. The rollers 35, 36 must be lightweight so that they have minimum inertia since they must be reversed in a fraction of a second. Yet the rollers 35, 36 must have a durable circumferential surface which has a high coefficient of friction, and a small footprint. Preferably the rollers 35, 36 are of aluminum or ABS plastic. The rollers 35, 36 may also have a roughened circumferential surface (especially if of aluminum), or a synthetic or natural rubber O-ring, or like elastomeric material, may extend around the circumferential surfaces of the rollers 35, 36.

Figure 2:
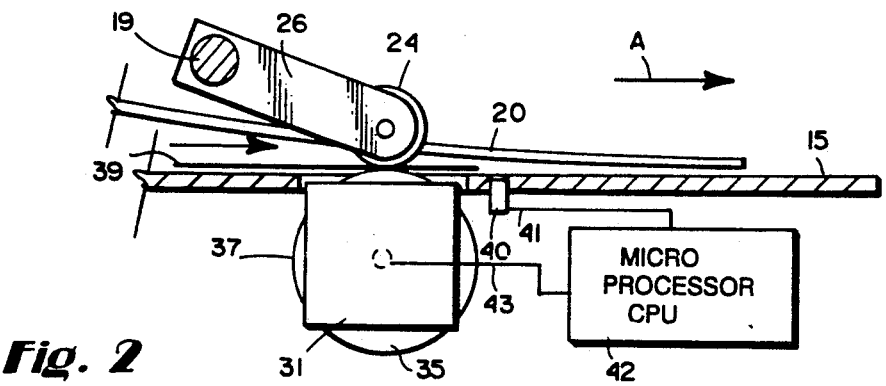
FIG. 2 is a side schematic view, partly in cross section and partly in elevation, of the operative components for effecting turning of the apparatus of FIG. 1.
Figure 3:
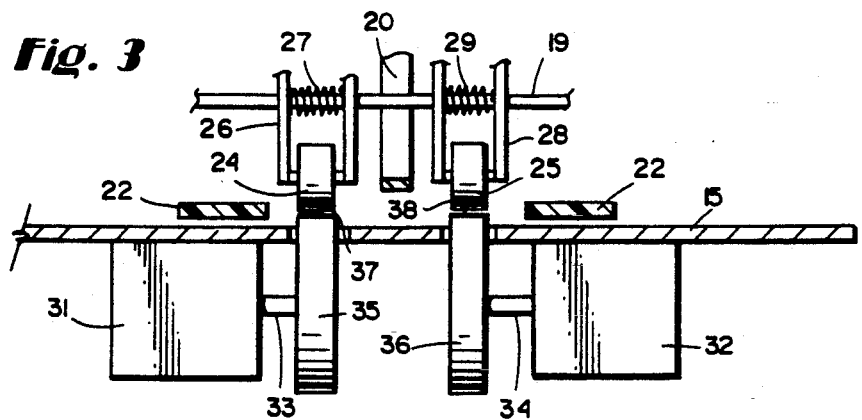
FIG. 3 is a front view, partly in cross section and partly in elevation, of the rollers and related components of the apparatus of FIG. 2.
Figure 6:
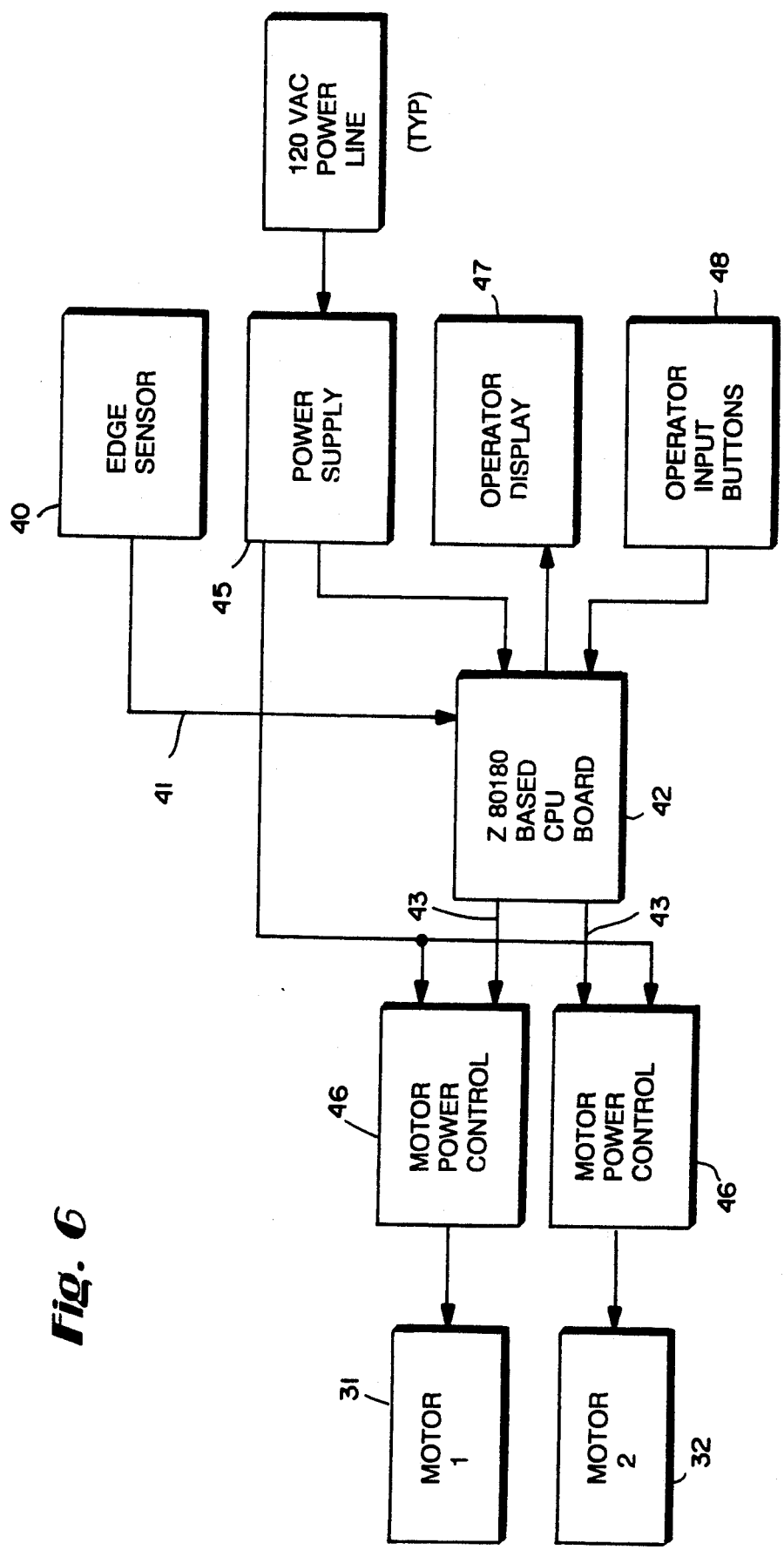
FIG. 6 is an electrical schematic of the apparatus of FIGS. 1 through 3.

Located downstream, in the first direction A, of the rollers 35, 36 is an edge sensor 40, for sensing the leading edge of a sheet 39. The edge sensor 40 may be a photosensor, or any other desirable conventional type of sensor which can sense the leading edge of the sheet 39. For example, the sensor and related hardware may comprise commercially available fiber optical cable, an FEF-PAD6 series Microswitch, and devices in the MFOD (receiver) and MFOE (transmitter) series from Motorola. As seen in FIGS. 2 and 6, the sensor 40 may communicate with line (e.g. fiber optical cable) 41 with a microprocessor CPU 42, while the microprocessor 42 communicates via lines 43 with the motors 31, 32.

The location of edge sensor 40 is not particularly critical, just so that it is adjacent the rollers 35, 36, preferably downstream of them, and a distance from the rollers 35, 36 in the first direction A which is less than half the shortest dimension of the sheet 39 in the direction A. Also the sensor 40 should be under the sheet 39 during rotation to prevent sensor from detecting an edge falsely, and starting its counter again. The module 10 can transfer the sheet from landscape to portrait, or vice-versa, or positions inbetween.

The electrical interconnection between various components is schematically illustrated in FIG. 6. The microprocessor CPU 42 is a control means for controlling the speed and direction of rotation of the shafts 33, 34 of the drives 31, 32, acting through conventional motor power controllers 46, which may provide either 200 or 400 steps per revolution of the drives 31, 32 if stepping motors. For example, integrated circuits Nos. L297 and L298 from SGS Thompson may be utilized as the motor controllers 46. The power supply 45 (e.g., from a 120 volt A.C. power line) provides the power to the CPU 42 and to the power controllers 46. An operator display 47 is preferably also driven by the CPU 42, and operator input buttons 48 are provided for providing input to the CPUs for the length and width of the sheet, or other parameters desired to optimize a particular turning operation.

The turn module 10 according to the invention can be utilized to rotate a sheet 39 any desired angular amount, and in either the clockwise or counterclockwise direction. However, for the majority of its uses, the turn module 10 will rotate a sheet 39 ninety degrees (90°), typically from landscape to portrait mode, or vice versa, while the sheet 39 is continuously being conveyed in the first direction A. An exemplary operation performed according to the invention is illustrated schematically in FIGS. 4 and 5. While this example will be described with respect to certain speeds and orientations, it is to be understood that the speeds and orientations can be varied widely depending upon the particular sheets 39 being handled, and the desired end uses.

As the sheet 39 is fed in the first direction A, just before the midpoint of sheet 39 reaches the rollers 35, 36, the edge sensor 40 senses the sheet 39 leading edge. At this point in time, the circumferential surfaces 37, 38 of the rollers 35, 36 are both rotating clockwise (as viewed from the bottom edge of the sheet in FIG. 4) so as to assist in feeding the sheet 39 in the first direction A at a given speed, for example, each about 400 feet per minute (fpm). The sensor 40 then—through the CPU 42—controls the motor 32 so that the direction of rotation of the roller 36 is immediately, instantaneously, reversed, and it is brought up to the speed of −400 feet per minute. That is, the tangential direction of movement of the surface 38 will be opposite to the first direction A. This action causes the sheet 39 to rotate counterclockwise, from the landscape mode illustrated in FIG. 4, to the portrait mode illustrated in FIG. 5. Once the 90° rotation has been effected—determined by how long the motor 32 is operated in reverse, and knowing the dimensions of the sheet 39—the CPU 42 again controls the motor 32 so that it rotates the roller 36 in the same direction as the roller 35, and at the same speed. During this entire time, the conveyor belts 22 are continuing to urge the sheet 39 in the first direction A, but the rollers 35, 36—acting with nip wheels 24, 25—have a much more positive control over the sheet 39. Once the 90° turn has been completed—from FIG. 4 to FIG. 5—then the sheet 39 is conveyed in the first direction A to the conveyor 13.

Figure 4:
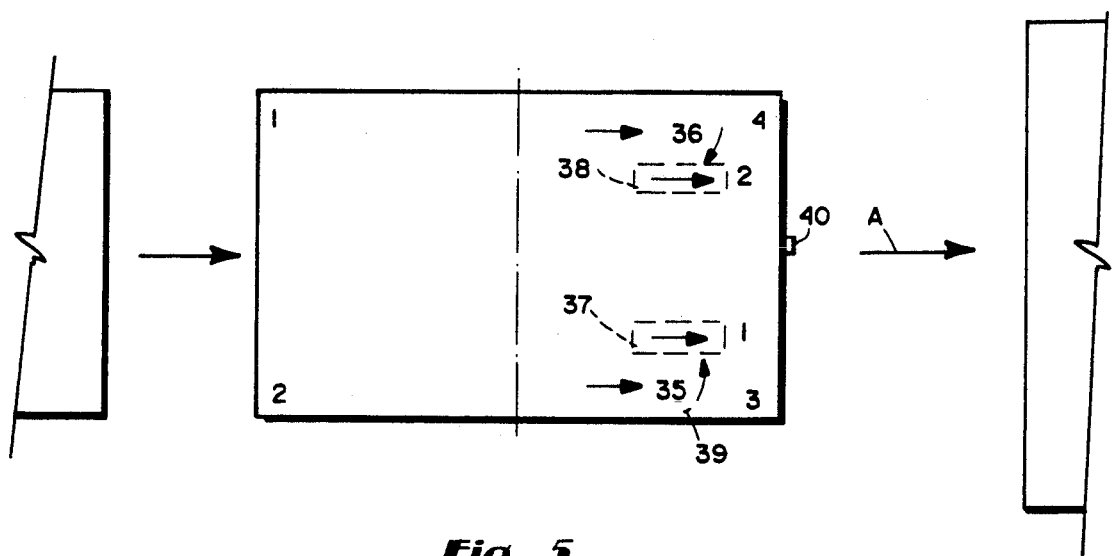
FIGS. 4 and 5 are schematic plan views illustrating the operation of the apparatus of FIGS. 1 through 3 to effect rotation of a sheet from landscape mode to portrait mode.
Figure 5:
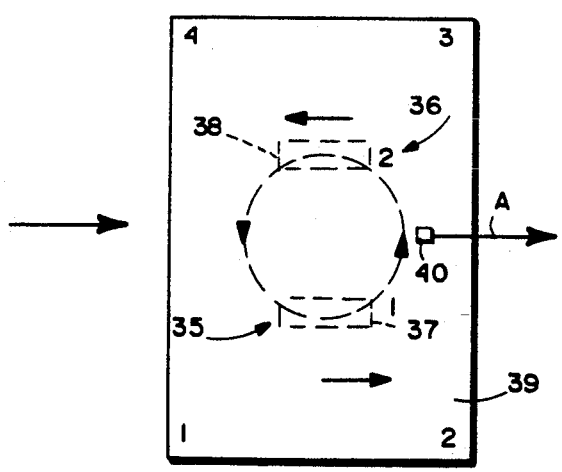

While a 90° rotation in the counterclockwise direction has been described with respective to FIGS. 4 and 5, by reversing the operation of the motors 31, 32, the sheet 39 can be made to rotate clockwise instead of counterclockwise, and by controlling the relative speeds and direction of the rollers 35, 36, virtually any degree of turn desired can be effected.

Figure 7:
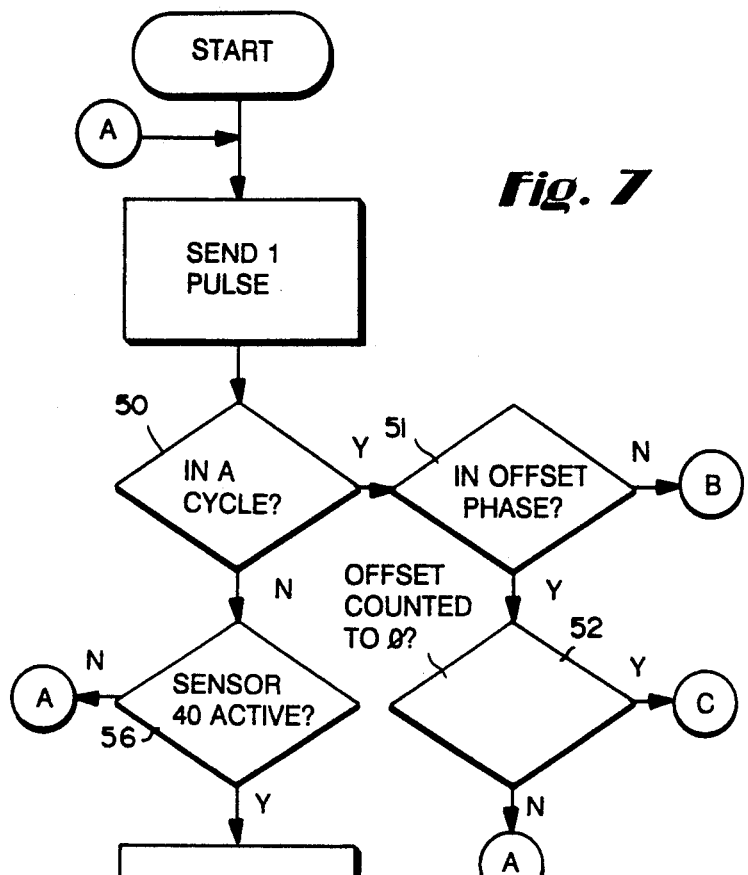
FIGS. 7 through 9 are logic flow charts illustrating one exemplary operation of the apparatus of FIGS. 1 through 3 and 6 in order to effect proper turning of sheets.
Figure 9:
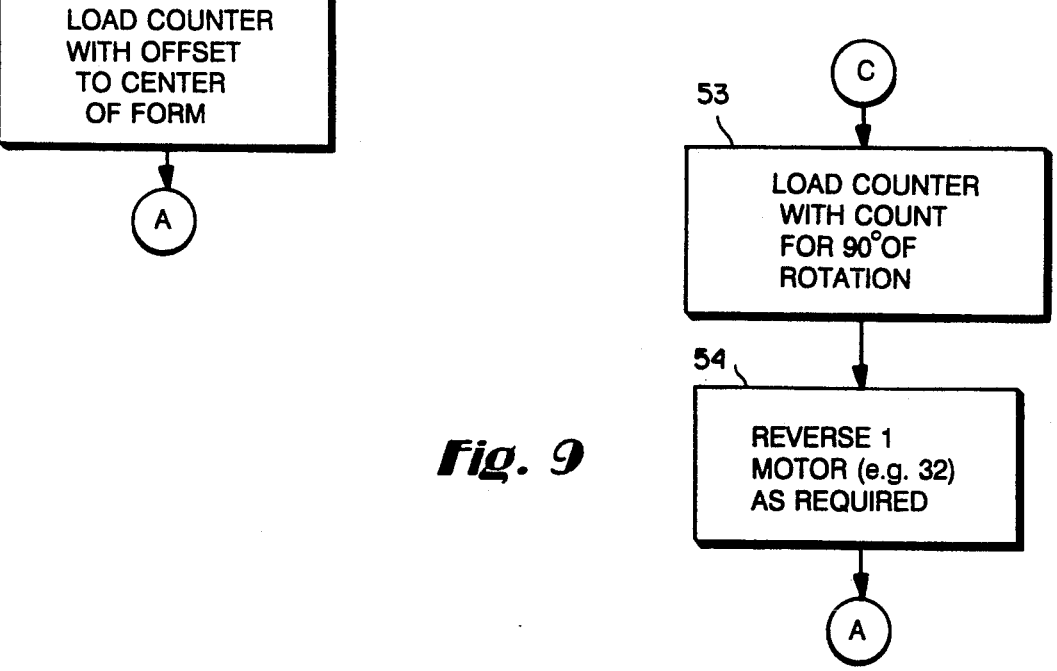
Figure 8:
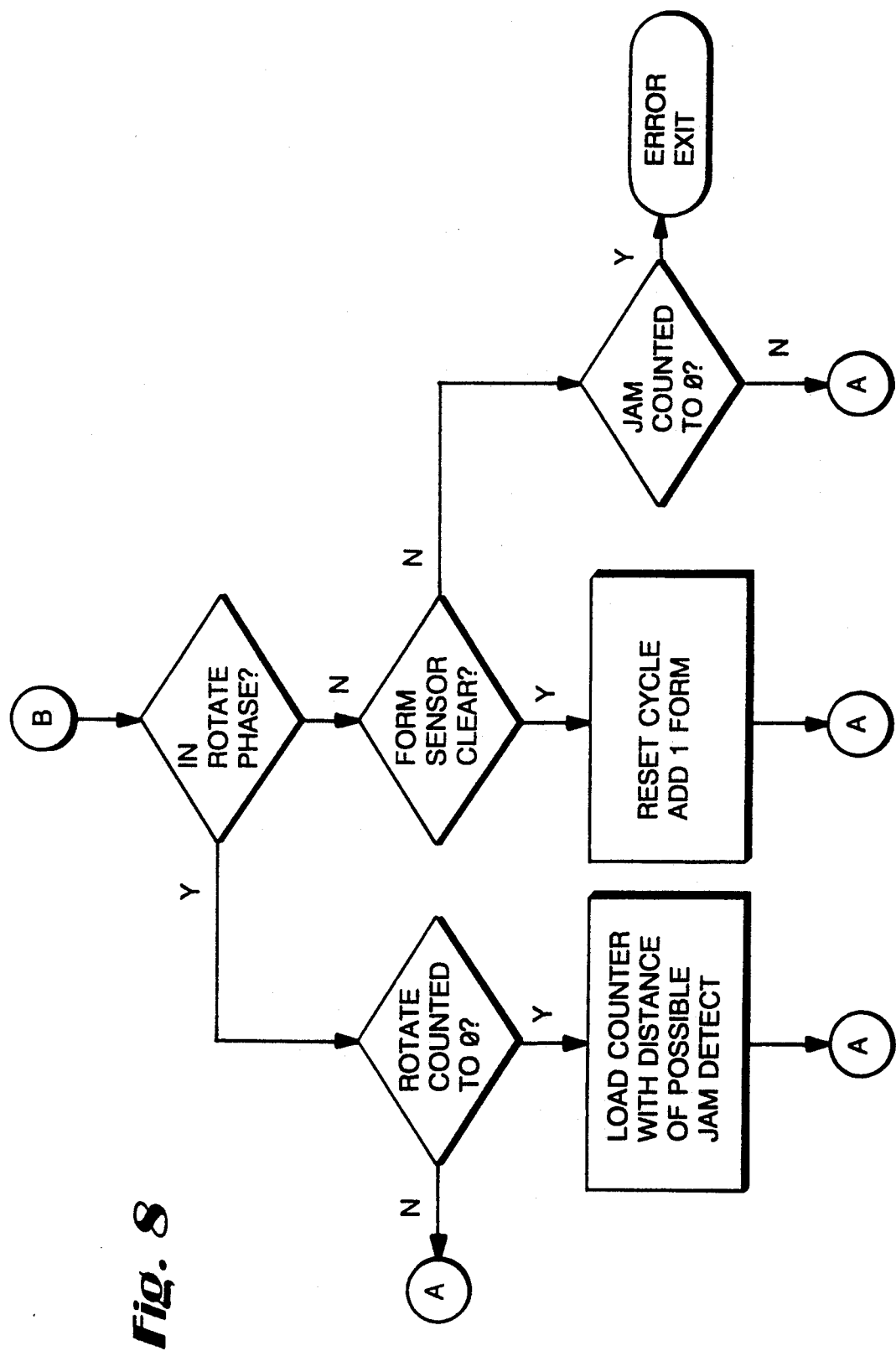

FIGS. 7 through 9 illustrate in logic flow chart format more detailed operations of the components that may be provided by proper control of the CPU 42 with software. While the flow sheets are basically self-explanatory, a few comments with respect thereto, will be provided.

In a normal mode of operation of the assembly, and assuming that the sensor 40 and all other components are activated, when there is a Yes in the decision block 50, and Yes is in the subsequent decision blocks 51, 52 (see FIG. 7), a counter is loaded—at step 53 (see FIG. 9)—to count the time of reverse operation of one of the motors 31, 32 to effect the 9020 rotation. Then one of the motors 31, 32 is controlled as indicated at 54—e.g., the motor 32—to reverse its rotation to effect the 90° turning of the business form or like sheet 39. After the expiration of the particular time period counted by the counter, the normal operation of the motor 32 is restored, and the sequence starts again.

As is illustrated in FIG. 7, if there is a "No" in the decision block 50, the sensor 40 is first polled, as indicated by decision block 56, and depending upon the sensor 40 state one of two different procedures will be implemented. If there is a "No" in decision block 51, as illustrated in FIG. 8, the CPU 42 may be controlled by the software to locate a jam, control the operator display 47 to indicate the aberrant condition, and ultimately exit with an error code, and shutting down the equipment as necessary, depending upon the situation.

Of course, a wide variety of other apparatus may be also associated with the turn module 10. For example, there may be covers and guards that are electrically interlocked as necessary for safety, jam sensors may be provided upstream and downstream from the rollers 35, 36, there may be interlocks to and from the ancillary equipment 11, 13, etc. However, such structures do not form part of the invention, but rather the invention is directed to the apparatus and method for simply and positively executing turning of sheets, e.g., rotating business forms from landscape to portrait mode, and vice versa.

Utilizing the apparatus heretofore described in the method of reorienting the sheet according to the invention, first the sheet is fed with a first orientation (e.g., landscape mode—as illustrated in FIG. 4) in the first direction A to a location adjacent the rollers 35, 36, at which location the rollers 35, 36 engage the sheet 39. Also, at that location, the edge sensor 40 senses the leading edge of the sheet 39. In response to this sensing, the speed and direction of rotation of the motors 31, 32 is controlled by the CPU 42 so that the rollers 35, 36 rotate the sheet 39 to a predetermined second orientation (e.g., a portrait mode as illustrated in FIG. 5) significantly angularly displaced from the first orientation. After rotating action by the rollers 35, 36, the sheet 39 is continuously conveyed in the first direction A, and after turning is also conveyed in that direction.

Thus, it will be seen that the apparatus and method according to the invention comprise very few, and very simple, mechanical elements, and are capable of effecting complete rotation of a sheet 39 in a very small space. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent apparatus and methods.

What is claimed is:

1. Apparatus for rotating a sheet, comprising:

a conveyance surface on which a sheet, having a first orientation, travels in a first direction;

first and second rollers for engaging a sheet travelling on said conveyance surface and spaced from each other in a second direction, generally transverse to said first direction;

first and second drive means, operatively driving said first and second rollers, respectively, independently of each other, at least one of said drive means being reversible;

sensing means for sensing the leading edge of a sheet, having said first orientation, with respect to said rollers, said sensing means located downstream of said rollers in a first direction;

control means for controlling the speed and direction of rotation of said drive means in response to said sensing means to rotate the sheet so that it has a second orientation, significantly angularly displaced from the first orientation, comprising computer means for controlling said drive means to effect rotation of the sheet by driving the first roller so that the tangential velocity thereof is in the first direction, and by driving the second roller so that the tangential velocity thereof is in a second direction, opposite the first direction;

a nip wheel associated with each of said first and second rollers for holding a sheet in contact therewith, said nip wheels being located above said conveyance surface; and conveyance means associated with said conveyance surface for delivering a sheet to said first and second rollers, and for transporting said sheet away from said first and second rollers, in said first direction.

2. Apparatus as recited in claim 1 wherein said drive means are reversible motors.

3. Apparatus as recited in claim 2 wherein said reversible motors are D.C. stepper motors.

4. Apparatus as recited in claim 1 further comprising a flexible hold-down strap extending between said nip wheels in said first direction for facilitating holding of sheets in contact with said conveyance surface, said hold-down strap extending between said first and second rollers.

5. Apparatus as recited in claim 1 wherein said conveyance means comprise a pair of conveyor belts disposed on said conveyance surface, said belts being located outside of said first and second rollers.

6. Apparatus as recited in claim 1 wherein said first and second rollers are of low inertia material with the circumferential peripheral surfaces thereof having a high coefficient of friction.

7. Apparatus as recited in claim 6 wherein said rollers are of a material selected from the group consisting essentially of aluminum and ABS plastic.

8. A method of re-orienting a sheet using first and second drive means, rotating first and second rollers, respectively, independently of each other, the rollers being spaced apart in a second direction, generally transverse to the first direction, comprising the steps of:
  (a) feeding the sheet, with a leading edge and in a first orientation, in a first direction to a sensing location adjacent, but downstream of in the first direction, the first and second rollers;
  (b) at the sensing location, sensing the leading edge of the sheet; and
  (c) in response to step (b), controlling the drive means to, in turn, control both the speed and direction of rotation of the rollers, so that the rollers rotate the sheet to a predetermined second orientation, significantly angularly displaced from the first orientation, by controlling the first drive means so that the tangential velocity of the first roller is in a second direction, opposite the first direction, to move the sheet through an angle of approximately 90°.

9. A method as recited in claim 8 comprising the further step (d), after step (c), of conveying the sheet in the first direction.

10. A method as recited in claim 8 wherein step (c) is practiced to control the rollers so that each has speed of rotation of about 400 fpm, in opposite directions.

11. A method as recited in claim 8 wherein step (b) is practiced at a location less than one-half the dimension of a sheet in the first direction when it has the first orientation, and under the sheet while step (c) is practiced.

12. A method as recited in claim 8 wherein the first and second drive means rotate the first and second rollers at the same speed, but in opposite directions of rotation, in the practice of step (c).

13. A method as recited in claim 8 wherein step (c) is practiced to control the rollers so that each has speed of rotation of about 400 fpm, in opposite directions.

14. A sheet handling assembly, comprising:
  a substantially planar, generally horizontal, conveyance surface;
  first and second driven shafts having substantially in-line axes of rotation;
  first and second rollers driven by said first and second driven shafts, respectively, independently of each other;
  said first and second rollers each having a circumferential peripheral surface portion thereof extending up through said generally horizontal surface, so that said peripheral surfaced of each is above said generally horizontal surface; said rollers being of low inertia material with the circumferential peripheral surfaces thereof having a high coefficient of friction;
  a sensor having a sensing element extending into a position along said generally horizontal surface adjacent said rollers;
  a controller operatively connected to said driven shafts and to said sensor; and
  conveyor means cooperating with said generally horizontal surface for conveying a sheet therealong into operative association with, and away from, said rollers.

15. An assembly as recited in claim 14 further comprising conveyor means cooperating with said generally horizontal surface for conveying a sheet therealong into operative association with, and away from, said rollers.

16. An assembly as recited in claim 14 further comprising hold down means associated with said rollers for holding a sheet into operative association therewith.

17. An assembly as recited in claim 16 wherein said hold-down means comprise a nip wheel associated with each of said first and second rollers, each nip wheel mounted for pivotal movement about a generally horizontal axis parallel to the axes of said driven shafts, and the axis of the nip wheels mounted for up and down movement with respect to said first and second rollers by a spring loaded arm.

18. An assembly as recited in claim 14 wherein said rollers are of a material selected from the group consisting essentially of aluminum and ABS plastic.

19. Apparatus for rotating a sheet, comprising:
  a conveyance surface on which a sheet, having a first orientation, travels in a first direction;
  first and second rollers for engaging a sheet travelling on said conveyance surface and spaced from each other in a second direction, generally transverse to said first direction;
  first and second drive means, operatively driving said first and second rollers, respectively, independently of each other, at least one of said drive means being reversible;
  sensing means for sensing the leading edge of a sheet, having said first orientation, with respect to said rollers, said sensing means located downstream of said rollers in a first direction, said sensing means consisting of a single sensor; and
  control means for controlling the speed and direction of rotation of said drive means in response to said sensing means to rotate the sheet so that it has a second orientation, significantly angularly displaced from the first orientation.

20. A method of re-orienting a sheet using first and second drive means, rotating first and second rollers, respectively, independently of each other, comprising the steps of:
  (a) feeding the sheet, with a leading edge and in a first orientation, in a first direction to a sensing location adjacent, but downstream of in the first direction, the first and second rollers;

(b) at the sensing location, sensing the leading edge of the sheet; and (c) in response to step (b), controlling the drive means to, in turn, control both the speed and direction of rotation of the rollers, so that the rollers rotate the sheet to a predetermined second orientation, significantly angularly displaced from the first orientation, the first and second drive means rotating the first and second rollers at the same speed, but in opposite directions of rotation.

* * * * *